United States Patent
Caligaris et al.

(10) Patent No.: US 11,447,409 B2
(45) Date of Patent: Sep. 20, 2022

(54) METHOD FOR THE BIOLOGICAL TREATMENT OF NITROGEN IN EFFLUENTS BY NITRITATION

(71) Applicant: Suez Groupe, Paris (FR)

(72) Inventors: Marc Caligaris, Triel sur Seine (FR); Thibaut Saur, Paris (FR); Irène Mozo, Paris (FR)

(73) Assignee: Suez International, Paris (FR)

( * ) Notice: Subject to any disclaimer, the term of this patent is extended or adjusted under 35 U.S.C. 154(b) by 0 days.

(21) Appl. No.: 16/652,190

(22) PCT Filed: Oct. 4, 2018

(86) PCT No.: PCT/FR2018/052453
§ 371 (c)(1),
(2) Date: Mar. 30, 2020

(87) PCT Pub. No.: WO2019/069031
PCT Pub. Date: Apr. 11, 2019

(65) Prior Publication Data
US 2020/0299163 A1  Sep. 24, 2020

(30) Foreign Application Priority Data
Oct. 4, 2017 (FR) ........................................ 1759306

(51) Int. Cl.
*C02F 3/30* (2006.01)
*C02F 3/00* (2006.01)
(Continued)

(52) U.S. Cl.
CPC .............. *C02F 3/307* (2013.01); *C02F 3/006* (2013.01); *C02F 3/12* (2013.01); *C02F 3/301* (2013.01);
(Continued)

(58) Field of Classification Search
CPC .. C02F 3/307; C02F 3/006; C02F 3/12; C02F 3/301; C02F 3/305; C02F 3/303;
(Continued)

(56) References Cited

U.S. PATENT DOCUMENTS

| 5,863,435 A | 1/1999 | Heijnen et al. |
| 6,383,390 B1 | 5/2002 | Van Loosdrecht et al. |

(Continued)

FOREIGN PATENT DOCUMENTS

CN  102725235 A  10/2012

OTHER PUBLICATIONS

International Search Report issued in International Patent Application No. PCT/FR2018/052453 dated Nov. 20, 2018.

*Primary Examiner* — Nam X Nguyen
*Assistant Examiner* — Julia L. Wun
(74) *Attorney, Agent, or Firm* — Morgan, Lewis & Bockius LLP (57) ABSTRACT

The invention relates to a method for the biological treatment of nitrogen in the form of ammonium in wastewater, by nitritation in a biological reactor, comprising: at least one step a of aerating the biological reactor containing the wastewater to be treated, at least one step b of eliminating at least part of the nitrites produced in step a, and a step c of extracting, from the reactor, a fraction of the sludge resulting from steps a and b. The invention also concerns a method for the biological treatment of nitrogen in wastewater, by nitritation/denitritation and/or deammonification, wherein the nitritation is implemented using the nitritation method according to the invention.

12 Claims, 6 Drawing Sheets

(51) Int. Cl.
*C02F 3/12* (2006.01)
*C02F 101/16* (2006.01)

(52) U.S. Cl.
CPC ........ *C02F 3/305* (2013.01); *C02F 2101/166* (2013.01); *C02F 2209/14* (2013.01)

(58) Field of Classification Search
CPC ............ C02F 2101/166; C02F 2101/16; C02F 2209/14; C02F 2209/15; C02F 2209/22; C02F 2301/04; Y02W 10/10
USPC ................................ 210/605, 620, 903, 739
See application file for complete search history.

(56) References Cited

U.S. PATENT DOCUMENTS

2012/0261335 A1 10/2012 Lemaire et al.
2014/0069863 A1 3/2014 Wett et al.

[KEY for FIGS 3A and 3B: Heure = Time; Anoxie = Anoxia; en mg = in mg; Temps = Time]

[KEY: en = of; et = and; Rapport = Ratio; sortie = output]

Figure 5

[KEY: Temps = Time]

Figure 6

[KEY: Enrichissement = Enrichment; Jour = Day]

METHOD FOR THE BIOLOGICAL TREATMENT OF NITROGEN IN EFFLUENTS BY NITRATION

The invention relates to a method for the biological treatment of nitrogen in effluents by nitration. The invention also relates to a method for the biological treatment of nitrogen in effluents by nitritation-denitritation and/or deammonification, also known as Partial Nitritation—Anammox, in which the nitritation is carried out by the nitritation method according to the invention.

Typically, wastewater treatment plants are primarily designed to remove carbon, nitrogen, and phosphorus by means of biological processes which use specific bacteria.

Nitrogen treatment generally involves nitrification followed by denitrification. Nitrification is an oxidation reaction by autotrophic bacteria, ammoniacal nitrogen, or ammonium, also known as NH4 or $NH_4+$, into:
- nitrous nitrogen, also known as nitrite, NO2 or $NO_2^-$;
- then nitric nitrogen, also known as nitrate, NO3 or $NO_3^-$.

Denitrification consists of a reduction into nitrogen gas, known as $N_2$, by denitrifying heterotrophic bacteria, of the nitrites or nitrates produced during nitrification reactions.

More precisely, nitrification consists of two sub-steps: a first nitritation step followed by a second nitratation step. Nitritation consists of the oxidation of ammonium to nitrite by autotrophic nitriting bacteria, known as AOB or "Ammonia-Oxidizing Bacteria" whose predominant genus is *Nitrosomonas*. Nitratation consists of the oxidation of nitrite to nitrate by other autotrophic bacteria, known as NOB or "Nitrite-Oxidizing Bacteria" whose predominant genus is *Nitrobacter*.

Denitrification can also be broken down into two sub-steps: a denitratation step which will convert the nitrates into nitrite, and a denitritation step which will convert these nitrites into nitrogen gas.

To reduce the amount of energy used for the treatment of nitrogen, other metabolic pathways can be considered: nitritation-denitritation and deammonification.

The nitritation-denitritation method seeks to stop the oxidation of nitrogen at the nitrites stage by avoiding the production of nitrates, hence the nitrite shunt of the "Nitrate part" of the cycle.

To implement nitritation-denitritation, it is therefore necessary to supress the NOB in favor of the AOB. This method results in savings of 25% in the required oxygen and 40% in the required carbon.

Another method, called deammonification or partial nitritation/anammox, uses bacteria known as Anammox (for "ANaerobic AMMonium, OXidation") which have the feature of being able to convert nitrites and ammonium into $N_2$ under anoxic conditions, without the need for external carbon. The method of deammonification by Anammox makes use of partial nitritation of ammonium. About 57% of the ammonium must be converted into nitrite in order to be able to carry out a complete deammonification.

NOB suppression has been widely studied. However, currently the implementation of this suppression in the treatment of nitrogen contained in effluents by nitritation-denitritation and deammonification is not optimized and remains difficult to implement.

The invention aims to optimize the treatment of nitrogen by nitritation-denitritation and deammonification by providing a nitritation method which effectively suppresses the activity of NOB and thus makes it possible to minimize the production of nitrates compared to the production of nitrites, in other words to block the oxidation of nitrogen in the form of ammonium, at the nitrites stage.

Consequently, an object of the present invention is a method for the biological treatment of nitrogen in the form of ammonium in wastewater, by nitritation in a biological reactor, comprising:
  at least one step a of aerating the biological reactor containing the wastewater to be treated in order to obtain a concentration of dissolved oxygen in the reactor that is greater than or equal to 1 mg/L, so as to oxidize at least part of the ammonium into nitrites by the ammonia-oxidizing bacteria present in said reactor,
characterized in that the method further comprises:
  at least one step b of eliminating at least part of the nitrites produced in step a by:
  a sampling b1 of the water treated in step a outside the reactor, and/or by
  an anoxic biological transformation b2, steps a and b being carried out cyclically so that the nitrite concentration in the reactor at the start of step a is less than 2 mg of N-NO2/L or at least two times lower than the concentration of ammonium in the reactor, and
  a step c of extracting, from the reactor, a fraction of the sludge resulting from steps a and b, per unit of time, calculated so that an effective age of aerated sludge of the reactor is obtained which is less than or equal to a theoretical minimum age of aerated sludge necessary for nitrification as defined by a decreasing exponential distribution as a function of the temperature,
such that the production of nitrates, in other words nitratation, is minimized in comparison to the production of nitrites, in other words nitritation, in the reactor by suppressing the activity of nitrite-oxidizing bacteria, by means of said aeration in step a, said elimination of nitrites in step b, and said effective age of aerated sludge in step c.

In the present application, the concentrations of nitrates, nitrites, ammonium are expressed in the form of nitrogen content: namely N-NO2 for the nitrite concentration; N-NO3 for the nitrate concentration, and N-NH4 for the ammonium concentration.

Wastewater is understood to mean any type of urban, industrial, or domestic effluent containing nitrogen that is at least partly in the form of ammonium. Industrial effluent is understood to mean an effluent from any type of industry including agriculture.

The wastewater which feeds the reactor is unprocessed water or water previously treated, in particular by a carbon treatment step.

The biological reactor is a reactor suitable for nitrification, in other words comprising ammonia-oxidizing bacteria, such as a biological reactor conventionally used for the treatment of nitrogen in effluents. The biological reactor is called a nitritation reactor or biological nitritation reactor in the present application. This reactor also comprises nitrite-oxidizing bacteria, which are present in biological reactors for the treatment of nitrogen in effluents. This concerns in particular an activated sludge reactor with microbial cultures, with dissociation of the hydraulic retention time and the sludge retention time, said sludge being in the form of bacterial aggregates of the floccular or granular type.

The reactor may be a closed tank or an open basin. The reactor may be a simple reactor, meaning it contains a single tank or basin, or a multiple reactor containing several tanks or basins, eventually connected together, in particular to allow the recirculation of water and/or sludge.

The feed to the reactor may be continuous, corresponding to a continuous process, or discontinuous, corresponding to a discontinuous process. A continuous reactor is in particular of the complete-mix, plug flow, step feed, or ditch type. A discontinuous feed reactor is in particular a sequential biological reactor or sequencing batch reactor, known as SBR, in particular a constant-level sequencing batch reactor.

In the various embodiments of the method of the invention, the aeration of the reactor, meaning step a, is advantageously carried out by injection or insufflation of gaseous oxygen into the reactor. The oxygen may be supplied in pure form or advantageously in the form of air which typically comprises about 20% oxygen. The oxygen supply means may be formed by a fan, blower, or compressor bringing air into the biological reactor. The concentration of dissolved oxygen in the reactor during the aeration step a is an average concentration which results from continuous or discontinuous aeration of the reactor. The air flow injected into the reactor during the aeration step is controlled so that the concentration of dissolved oxygen or DO in the reactor is maintained at an average value greater than or equal to 1 mg/L. The reactor advantageously comprises means for measuring and eventually regulating the concentration of dissolved oxygen in the reactor, for example such as a dissolved oxygen analyzer and/or sensor.

The reactor advantageously comprises a mixer which allows stirring the reactor during the anoxic step, or step b2, and optionally also during the aeration step, or step a.

The concentration of dissolved oxygen, or DO, in the reactor during the aeration step a is advantageously greater than or equal to 1.5; 2; 2.5; 3; or 3.5 mg/L, preferably greater than or equal to 2 mg/L.

Step a allows oxidation of at least part of the ammonium, meaning at least partial nitritation. Partial nitritation is important for the treatment of nitrogen by deammonification. To obtain partial nitritation, the aeration, or step a, is stopped when part of the ammonium has been oxidized to nitrites. To control the percentage of ammonium oxidized during the aeration step, the reactor advantageously comprises means for measuring and eventually regulating the ammonium concentration in the reactor, such as for example an ammonium analyzer and/or sensor.

In the various embodiments of the method of the invention, the sampling b1 of water treated in step a, outside the reactor, implemented for the elimination of at least a portion of the nitrites produced in step a, is advantageously carried out by draining b3 at least a fraction of the contents of the reactor resulting from step a and/or by recirculating b4 at least a fraction of the contents of the reactor resulting from step a towards a second biological reactor which feeds the first. Said fraction is either an untreated fraction consisting of non-decanted sludge, or a fraction clarified by a prior sludge-decanting step between step a and step b.

The draining b3 is generally implemented in batch processes using SBR reactors, while the recirculation b4 is implemented in continuous processes using any type of reactor, such as a closed tank or an open basin, for example a ditch type of open basin. The biological elimination of nitrites in step b2 consists of the anoxic biological transformation of nitrites into nitrogen gas. The anoxic biological transformation b2 of nitrites is implemented in the biological nitritation reactor, or main reactor or first reactor, or in another biological reactor called the nitrite-treatment biological reactor, second reactor, or side reactor. This anoxic biological transformation b2 of nitrites is advantageously implemented by heterotrophic denitritation in the presence of carbon and/or deammonification by Anammox.

In addition, the sampling b1 and the biological transformation b2 are advantageously combined.

According to a first advantageous embodiment of the method, the elimination of at least part of the nitrites produced in step a is carried out by an anoxic biological transformation b2 and the sequence of steps a and b2 is repeated cyclically in the biological nitritation reactor. The nitrites produced during step a of a cycle, called cycle n, are eliminated during step b2 under anoxic conditions, so that the concentration of nitrites or $N-NO_2$ in the reactor at the start of step a of the next cycle, also called cycle n+1, is less than 2 mg of $N-NO_2/L$ or at least two times lower than the concentration of ammonium, or $N-NH_4$, in the reactor. This embodiment is preferred for continuous processes using any type of reactor with continuous feed, such as a reactor consisting of one or more closed tanks or one or more open basins, for example a reactor consisting of a ditch type of open basin.

According to a second advantageous embodiment of the method, the elimination of at least part of the nitrites produced in step a is carried out by the recirculation b4 of at least a fraction of the contents of the reactor resulting from step a towards a second biological reactor which feeds the first, and by the anoxic biological transformation b2 of the nitrites of said fraction in said second reactor. The fraction of the reactor content which is recirculated in step b4 is preferably an unclarified fraction. The nitrite-treatment biological reactor or second reactor or side reactor can be supplied with untreated water, as well as with sludge containing water loaded with nitrites coming from the nitritation reactor or main reactor or first reactor. The second reactor eliminates the nitrites by a biological transformation, in particular by heterotrophic denitritation in the presence of carbon. As a result, the treated sludge exiting the second reactor to feed the nitritation reactor has a nitrite concentration of less than 2 mg of $N-NO_2/L$ or at least two times lower than the concentration of ammonium or $N-NH_4$. This embodiment is preferred for continuous processes using any type of reactor with continuous feed, such as a reactor consisting of one or more closed tanks or one or more open basins, for example a reactor consisting of a ditch type of open basin.

According to a third advantageous embodiment of the method, the elimination of at least part of the nitrites produced in step a is carried out by the draining b3 of at least a fraction of the contents of the reactor resulting from step a and the anoxic biological transformation b2 of the fraction eventually remaining in said biological reactor. Preferably, the fraction of the reactor contents which is drained in step b3 is a fraction clarified by a prior sludge-decanting step between step a and step b3.

When the reactor contents are completely drained, there is no fraction remaining in the reactor and the biological transformation step b2 is omitted.

Steps a and b3, or a, b3, and b2 are repeated cyclically in the biological nitritation reactor. The nitrites produced during step a of a cycle or cycle n are eliminated, either entirely during the draining step b3, or partly during the draining step b3 and partly during the anoxic biological transformation step b2, so that the concentration of nitrites in the reactor at the start of step a of the following cycle or cycle n+1 is less than 2 mg of $N-NO_2/L$ or at least two times lower than the ammonium concentration in the reactor.

The third embodiment is preferred for batch processes using a sequencing batch reactor or SBR, in particular an SBR reactor characterized by simultaneous feeding and draining, in particular simultaneous feeding and draining at a constant level.

The fraction, preferably clarified, of the contents of the reactor which is drained in step b3 is advantageously removed into a second biological reactor and the nitrites present are eliminated by an anoxic biological transformation b2, in particular by heterotrophic denitrification in the presence of carbon and/or deammonification by Anammox, preferably deammonification by Anammox.

To control the elimination of nitrites in step b and check the nitrite concentration or the ratio of the ammonium and nitrite concentrations at the start of the aeration step a, the reactor advantageously comprises means for measuring and eventually regulating the nitrite concentration in the reactor, eventually associated with means for measuring and eventually regulating the ammonium concentration in the reactor, for example such as a nitrite analyzer and/or sensor, eventually associated with an ammonium analyzer and/or sensor.

In addition, to control the relative production of nitrites and nitrates, meaning the predominant production of nitrites compared to the lower production of nitrates during the aeration step, the reactor advantageously comprises means for measuring and eventually regulating the nitrate concentration in the reactor, for example such as a nitrate analyzer and/or sensor.

In the various embodiments of the method of the invention, step c of extracting, from the reactor, a fraction of the sludge resulting from steps a and b, per unit of time, is calculated so that at the end of the treatment in steps a and b, an effective age of aerated sludge from the reactor is obtained which is less than or equal to a minimum theoretical age of aerated sludge necessary for nitrification as defined by a decreasing exponential distribution as a function of the temperature. Said fraction of sludge which is extracted in step c is in particular a mass fraction.

The effective age of aerated sludge of the reactor, or $A_{effective}$, represents the sludge retention time during aeration in the reactor. It corresponds to the ratio of the quantity of sludge present in kg of dry matter or DM in the biological reactor over the quantity of excess sludge or E to be removed per day, in kg of DM/d.

Figure 1:
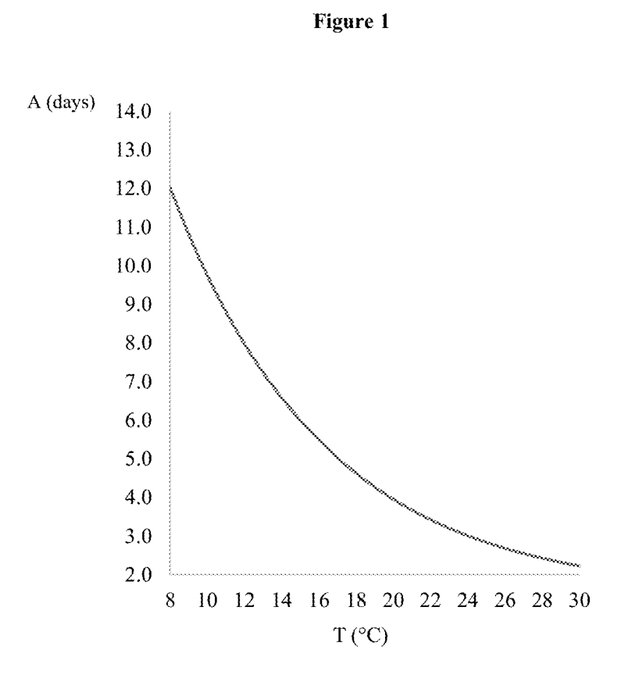
FIG. 1 shows the decreasing exponential curve of the minimum theoretical age of aerated sludge required for nitrification in days, or A, as a function of the temperature T in ° C.

The minimum theoretical age of aerated sludge, or $A_{theoretical}$, necessary for nitrification is defined in particular by the curve of FIG. 1. It can also be defined by the equation established by the ATV or "Abwassertechnische Vereinigung e.V.":

$$A_{theoretical} = A = SF \times 3.4 \times 1.103^{(15-T° C.)}$$

where T° C. is the temperature in degrees Celsius and SF is a correction factor of 1.45 to 1.8 depending on the size of the station for the biological treatment of nitrogen in effluents.

Step c is advantageously carried out by extracting per unit of time, for example each day, a determined mass fraction of the sludge from the reactor, in order to ultimately obtain said effective age of aerated sludge, as illustrated in the examples.

The effective age of aerated sludge of the reactor is advantageously between 50% and 90%, preferably between 60% and 80%, of the theoretical minimum age of aerated sludge.

Steps a, b and c of the method according to the invention are advantageously repeated until the ratio of the concentration of nitrites or [N-NO2] to the sum of the concentrations of nitrites and nitrates or [N-NO2]+[N-NO3] at the end of the aeration step a is greater than or equal to 0.8 or 80% when this ratio is expressed as a percentage, preferably greater than or equal to 0.9 or 90%. The ratio of the concentrations [N-NO2]/([N-NO2]+[N-NO3]) can be replaced by the ratio of the variation in the concentrations Δ[N-NO2]/(Δ[N-NO2]+Δ[N-NO3]) over the course of the aeration step a. When the ratio of the concentration of nitrites to the sum of the concentrations of nitrites and nitrates reaches a value greater than or equal to 0.8 or 80%, NOB suppression and the blocking of oxidation of nitrogen in the form of ammonium in the nitrites stage—meaning in the nitritation step—which is associated therewith are considered to be established in the biological reactor. After this establishment phase, the nitritation can be continued under the same conditions or else under less suppressive conditions, during the maintenance phase. Less suppressive conditions are obtained by lowering the concentration of dissolved oxygen in step a, eliminating step b of removing nitrites, and/or modifying the sludge extraction step c, so that the effective age of aerated sludge of the reactor is greater than or equal to the theoretical minimum age of aerated sludge as defined above.

The method for the biological treatment of nitrogen in the form of ammonium by nitritation according to the invention is advantageously carried out without prior seeding of the biological nitritation reactor with nitriting bacteria.

The method for the biological treatment of nitrogen in the form of ammonium by nitritation according to the invention which effectively suppresses the activity of NOB and thus makes it possible to block the oxidation of nitrogen in the nitrites stage is advantageously used in a method for the treatment of nitrogen in wastewater by nitritation-denitritation and/or deammonification.

Consequently, an object of the present invention is also a method for the biological treatment of nitrogen in the form of ammonium in wastewater, by nitritation-denitritation and/or deammonification, characterized in that the nitritation of nitrogen in the form of ammonium is implemented by the method for the biological treatment of nitrogen by nitritation as defined above.

In addition to the above arrangements, the invention also comprises other arrangements which will be apparent from the description which follows, which refers to example embodiments of the object of the invention which are in no way limiting, with reference to the accompanying drawings in which:

FIG. 4 shows the effect of the concentration of dissolved oxygen during the aeration phase, the effect of the elimination of nitrites, and the effect of the effective age of aerated sludge on the establishment of nitritation, measured by the evolution over time of the ratio [N-NO2]/([N-NO2]+[N-

NO3]) or [N-NOx] in the exiting water, in a biological reactor for the treatment of nitrogen in wastewater by nitritation-denitritation, with batch feeding (SBR reactor).

EXAMPLE 1: ESTABLISHMENT AND MAINTENANCE OF NITRATION BY NOB SUPPRESSION IN A CONTINUOUS-FEED NITRITATION-DENITRITATION REACTOR

The system for the biological treatment of effluent nitrogen is composed of two activated-sludge biological reactors of 4 and 8.9 $m^3$ respectively and a clarifier of 10.6 $m^3$, continuously supplied with 2 $m^3/h$ of urban wastewater treated beforehand to remove colloidal and particulate carbon. The biological reactors are equipped with a mixer, an aeration system, and means for measuring and regulating the concentration of dissolved oxygen, as well as means for measuring the concentrations of nitrites, nitrates, and ammonium. The treatment of nitrogen in ammonium form is begun without prior seeding of the biological reactor. The effect of the concentration of dissolved oxygen during the aeration phase, the effect of the elimination of nitrites before the aeration phase, and the effect of the effective age of aerated sludge on the suppression of NOB and the establishment of nitritation in the reactor were tested over time, according to the following experimental design:

phase S1:
The facility is started up without seeding to avoid having NOB and only forming AOB in phase S1.1 then draining the facility in phase S1.2 and restarting without seeding.

phase S2:
Application of standard nitrification parameters with a low concentration of dissolved oxygen of about 0.35 mg/L and no verification of the age of aerated sludge or sequenced aeration to eliminate the nitrites produced. Verification is understood to mean maintaining the system at a fixed age of aerated sludge by adjusting the sludge extraction volume.

phase S3:
Implementation of the three parameters with sequenced aeration consisting of successive cycles of a 30 min aeration step and a 30 min anoxic step. The concentration of dissolved oxygen in the reactor during the aeration phase is initially 1 mg/L in phase S3.1 then is reduced to 0.6 mg/l in phase S3.2 and then increased to 2.5 mg/L in phase S3.3. Sludge extraction is carried out daily, to obtain an effective age of aerated sludge equal to 70% of the theoretical minimum age of aerated sludge necessary for nitrification.

At startup in phase S1, which is carried out without seeding, a nitritation phase is observed with a ratio of [N-NO2]/[N-NOx] of approximately 80, linked to the expression of AOB. In the absence of management of the bacterial populations by controlled extraction of sludge and elimination of the nitrite before the aeration phase, the nitritation alone is quickly lost. Draining the facility in phase S1.2 and restarting allows quickly reestablishing nitritation, but then nitratation takes over. The NOB suppression is ineffective. In phase S3, the management of sludge extractions coupled with a concentration of dissolved oxygen of 1 mg/L in phase S3.1 and a sequenced aeration to eliminate the nitrites formed by heterotrophic bacteria allows nitritation to be established after 2 to 3 effective ages of aerated sludge. In phase S3.2, a test with a concentration of dissolved oxygen of 0.6 mg/l has the immediate consequence of nitratation of nitrites and therefore an expression of NOB. Once the concentration of dissolved oxygen has increased to 2.5 mg/L starting in phase S3.3, nitritation is reinstated after implementation of NOB suppression and is maintained for the long term over several months, with a ratio of [N-NO2]/[N-NOx] that is greater than or equal to 85%.

Figure 2:
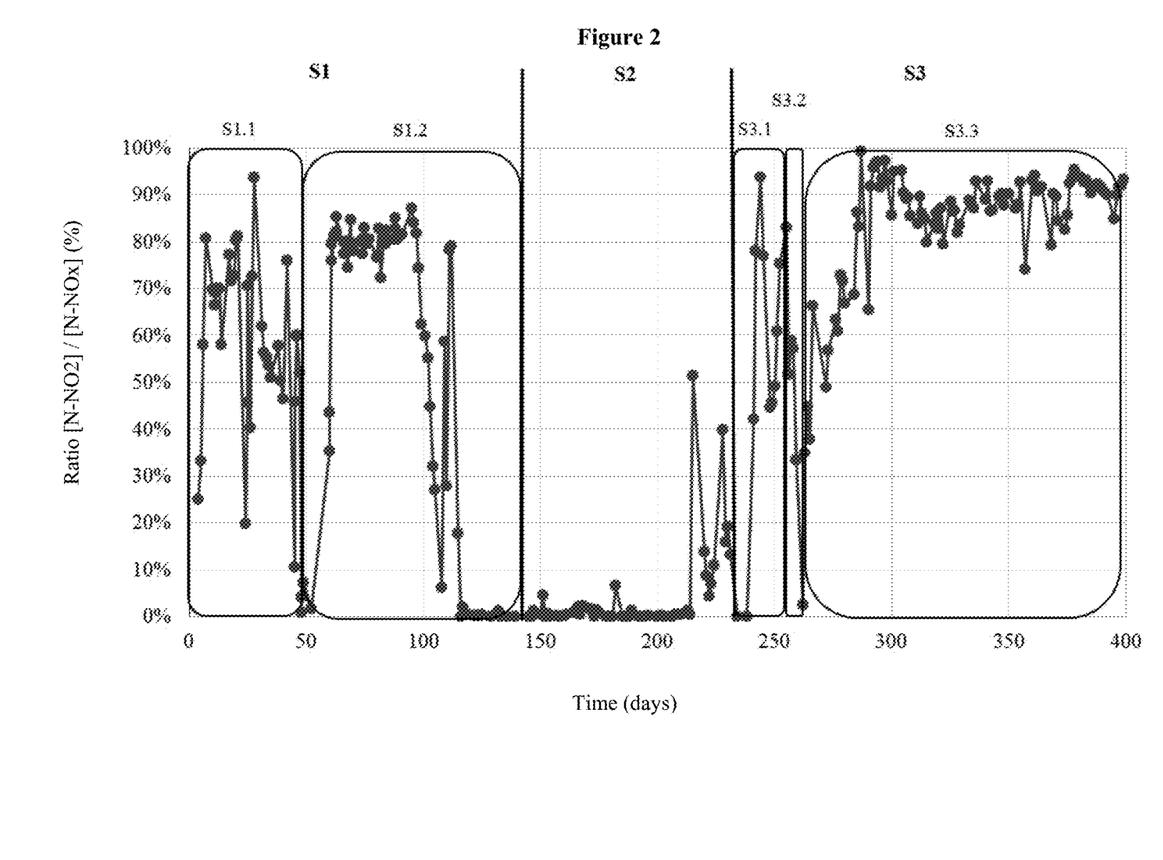
FIG. 2 shows the effect of the concentration of dissolved oxygen during the aeration phase, of the elimination of nitrites before the next aeration phase, and of the effective age of aerated sludge on the establishment of nitritation, measured by the evolution over time (in days) of the ratio [N-NO2]/[N-NOx] at the end of the aeration step, in a biological reactor for the treatment of nitrogen in wastewater by nitritation-denitritation, with continuous feeding.

The establishment of effective NOB suppression in the biological reactor is accompanied by a blocking of the oxidation of ammonium in the nitrite stages which is expressed as a minimal production of nitrates compared to the production of nitrites during the aeration step. As a result, measurement of the ratio of the concentration of nitrites to the sum of the concentrations of nitrites and nitrates at the end of the aeration step makes it possible to study the establishment of an effective NOB suppression in the biological reactor. This ratio was measured in the biological reactor over time, under the various nitritation conditions mentioned above and the results are presented in FIG. 2.

Figure 3A:
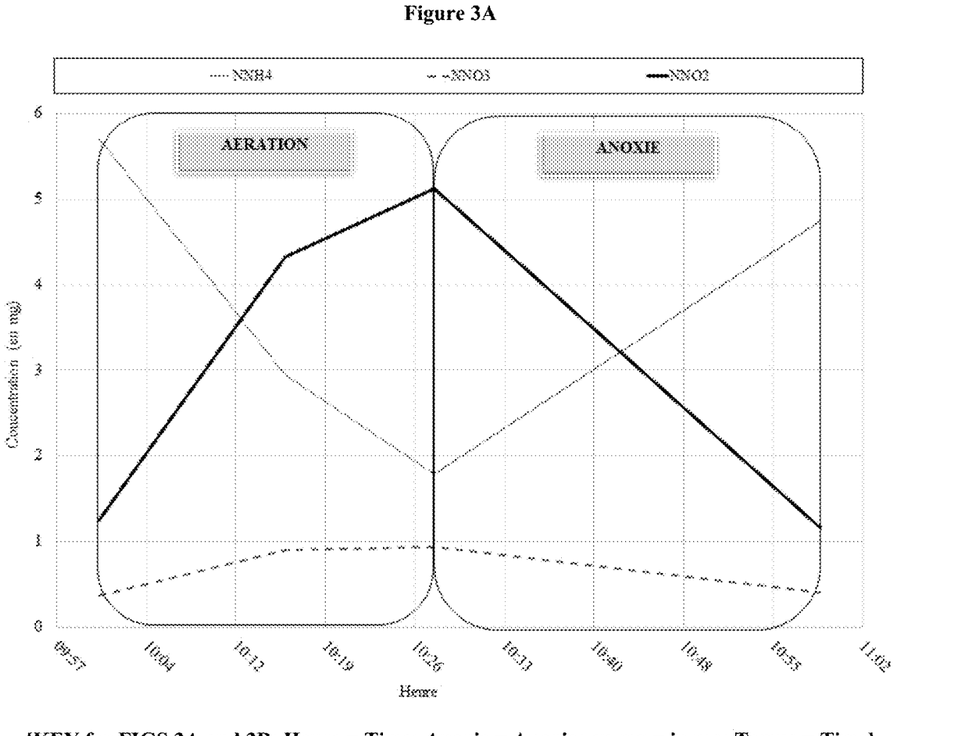
FIG. 3 shows the evolution of the concentrations of ammonium N-NH4, nitrites N-NO2, and nitrates N-NO3, during the aeration and anoxic steps, after the establishment of nitritation-denitritation in the biological reactor of FIG. 2, corresponding to phase S3.3. The measurements were made at two different times. A. The concentration of N-NO2 at the start of the aeration step is less than 2 mg/L. B. The concentration of N-NO2 at the start of the aeration step is at least two times lower than the concentration of N-NH4.
Figure 3B:
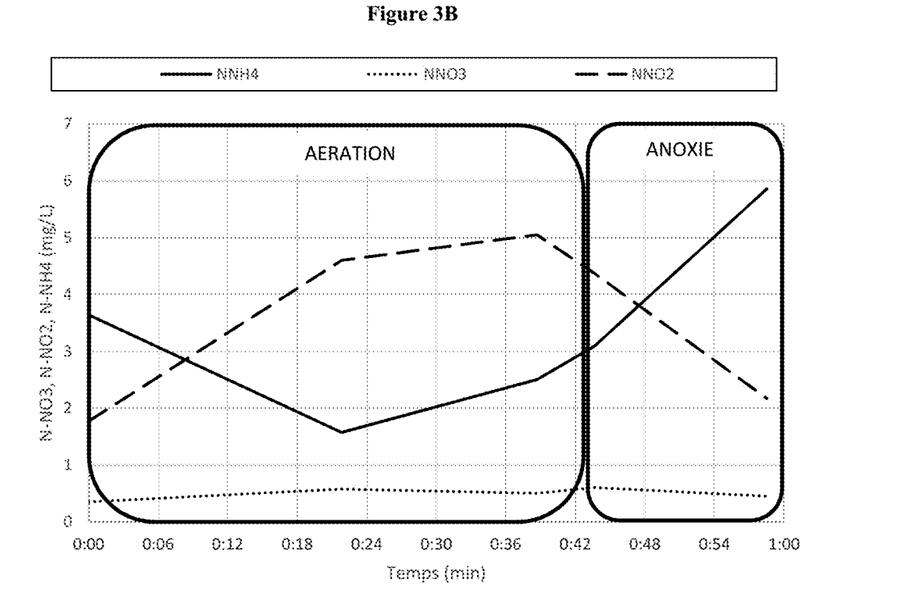

The evolution of the concentrations of ammonium, nitrites, and nitrates in the reactor occurred at two different times during phase S3.3 of establishing and maintaining NOB suppression. The results presented in FIGS. 3A and 3B show that during the aeration phase, the ammonium is converted into nitrites; the ammonium concentration in the reactor decreases and that of the nitrites, initially low at less than 2 mg of N-NO2/L (FIG. 3A) or at least two times lower than the concentration of ammonium N-NH4 (FIG. 3B), increases. On the other hand, the nitrate concentration does not vary during the aeration phase and remains at a low value, less than <1 mg/L (FIGS. 3A and 3B). The ratio [N-NO2]/[N-NOx] at the end of the aeration step is greater than 0.8 (FIGS. 3A and 3B). In the anoxic phase, a decrease is observed in the nitrites which are eliminated by the heterotrophs, in the presence of the carbon supplied by the untreated water. At the end of the anoxic phase, the nitrite concentration is low, less than 2 mg of N-NO2/L (FIG. 3A) or at least two times lower than the concentration of ammonium N-NH4 (FIG. 3B). As the aeration and anoxic steps are repeated cyclically, the nitrite concentration at the start of the aeration phase of the following cycle is therefore also low, less than 2 mg of N-NO2/L or at least two times lower than the concentration of ammonium N-NH4. Elimination of the nitrites limits the growth of NOB since they have no available substrate when oxygen is present. By coupling the elimination of nitrites with the extraction of sludge, we end up leaching the NOB from the reactor.

EXAMPLE 2: ESTABLISHMENT AND MAINTENANCE OF NITRATION BY NOB SUPPRESSION IN A BATCH-FEED SBR NITRITATION-DENITRITATION REACTOR

The biological reactor is a constant-level SBR type activated sludge reactor fed in batches, at 13.7 $m^3/d$, of urban wastewater treated beforehand to remove colloidal and particulate carbon as well as suspended matter. The dimensions of the reactor are as follows: diameter: 1.2 m; surface area: 1.13 m$^3$; total height: 4 m; water height: 3.18 m; volume: 3.6 m$^3$). The reactor is equipped with a mixer, an aeration system, and means for measuring and regulating the concentration of dissolved oxygen, as well as means for measuring the concentrations of nitrites, nitrates, and ammonium. The nitrogen treatment is implemented by successive cycles of the following four steps in sequence: a simultaneous feeding and draining step lasting 60 min, an anoxic step of 30 min, an aeration step of 60 min, and a decantation step of 60 min.

The effect of the concentration of dissolved oxygen during the aeration phase, the effect of the elimination of nitrites before the aeration phase, and effect of the effective age of aerated sludge on the suppression of NOB bacteria and the establishment of nitritation in the reactor were tested over time, according to the following experimental design:

Period 1 or P1

During this period, the concentration of dissolved oxygen during the aeration phase is 0.85 mg/L. 57% of the total volume of the reactor is replenished at the time of draining/feeding. Consequently, the nitrites produced during the aeration step are eliminated, partly by draining the reactor (57%) and partly (43%) by denitritation by heterotrophic bacteria. No sludge extraction is carried out during this period.

Period 2 or P2

During this period, the concentration of dissolved oxygen during the aeration phase is 0.85 mg/L. The elimination of nitrites produced during the aeration step is carried out as in period 1. Sludge extraction is carried out so that the effective age of aerated sludge of the reactor is equal to 70% of the theoretical minimum age of aerated sludge required for nitrification at this temperature.

Period 3 or P3

During this period, the concentration of dissolved oxygen during the aeration phase is 3.5 mg/L. The elimination of nitrites produced during the aeration step is carried out as in period 1. Sludge extraction is carried out so that the effective age of aerated sludge of the reactor is equal to 70% of the theoretical minimum age of aerated sludge required for nitrification at this temperature.

The following paragraph gives an example of managing the sludge age given the data for Period 3. In this period, the temperature was 19° C. in the reactor. Application of the ATV formula to calculate the theoretical minimum age of aerated sludge to allow nitrification yields:

$$1.8 \times 3.4 \times 1.103^{(15-19)} = 4.1 \text{ days where } SF=1.8$$

Considering a reactor aeration rate of 30% (fraction of time in aeration over total time), a minimum theoretical age of aerated sludge or $A_{theoretical}$ of 13.8 days is obtained. The following table shows the effective sludge ages ($A_{effective}$) for four one-week periods. The effective sludge ages are calculated according to the definition given on page 7 line 3.

| | Average sludge weight (kgDM) | Discharged sludge (kgDM/d) | Volume extracted (L/d) | $A_{effective}$ (d) | $A_{effective}/A_{theoretical}$ (%) |
|---|---|---|---|---|---|
| Week 1 | 6.2 | 0.54 | 319 | 11.3 | 82% |
| Week 2 | 5.3 | 0.62 | 424 | 8.5 | 62% |
| Week 3 | 5.6 | 0.59 | 385 | 9.4 | 68% |
| Week 4 | 4.8 | 0.48 | 359 | 10.0 | 73% |

The volumes extracted are calculated by considering the mass flow rate of the discharged sludge (in kgDM/d) divided by the concentration of sludge in the reactor (ratio of the weight of the sludge to the volume of said reactor).

Figure 4:
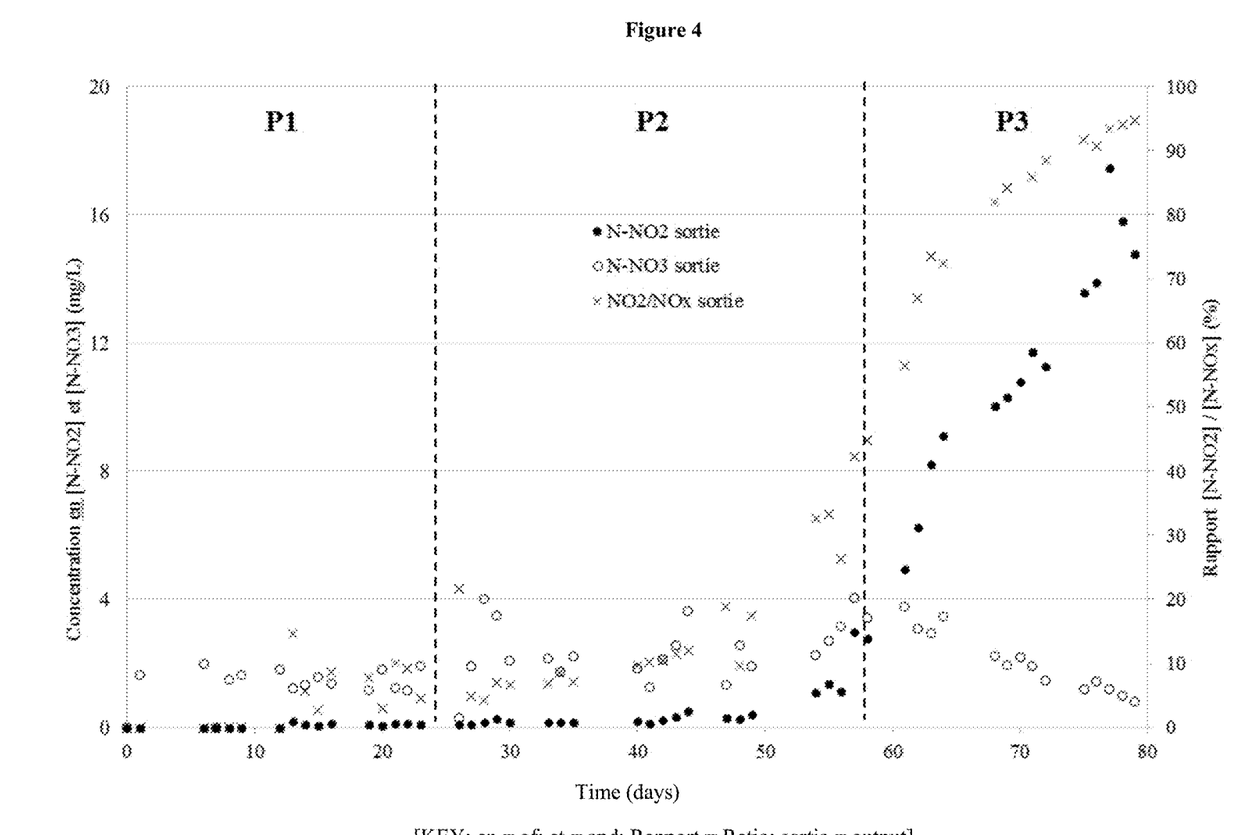

The ratio [N-NO2]/[N-NOx] in the biological reactor at the end of the aeration step was measured over time under the different nitritation conditions mentioned above and the results are presented in FIG. 4.

In the absence of a sufficient concentration of dissolved oxygen during the aeration step or of a sufficient sludge extraction, the production of nitrites in the reactor is negligible. Conversely, when the elimination of nitrites before the aeration step is combined with a sufficient concentration of dissolved oxygen during the aeration step and with a sufficient sludge extraction, a predominant production of nitrites is observed and a lower production of nitrates with a ratio [N-NO2]/[N-NOx] that is greater than 80%.

Figure 5:
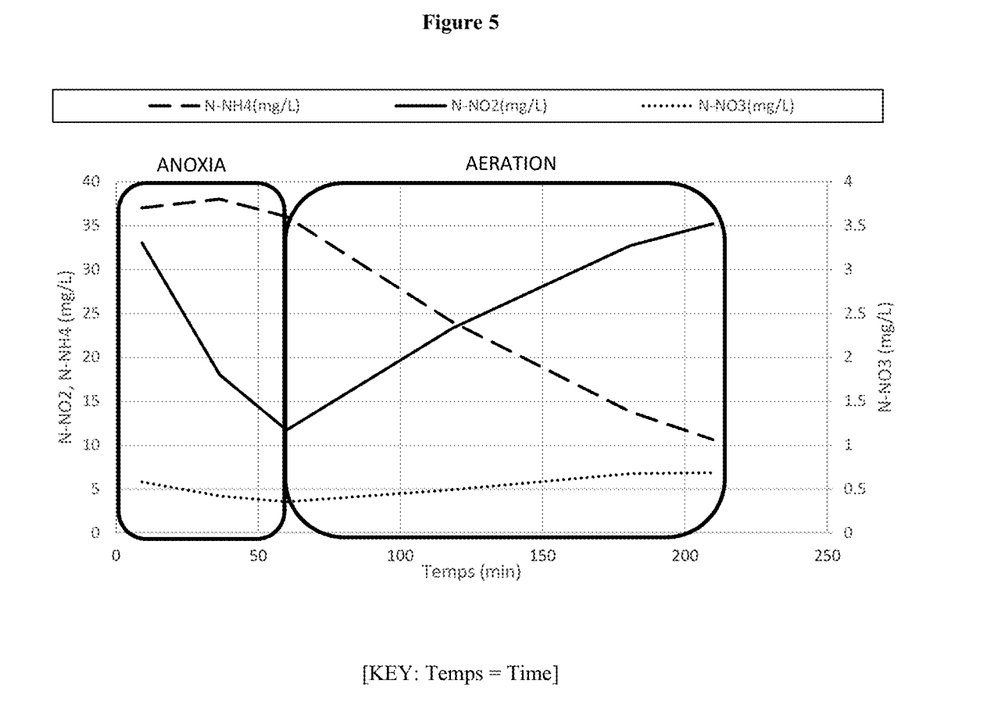
FIG. 5 shows the evolution of the concentrations of ammonium N-NH4, nitrites N-NO2, and nitrates N-NO3, during the aeration and anoxic steps, after the establishment of nitritation-denitritation in the biological reactor of FIG. 4, corresponding to the second half of phase P3 (time>70 days). The concentration of N-NO2 at the start of the aeration step is at least two times lower than the concentration of N-NH4.

The evolution of the concentrations of ammonium, nitrites, and nitrates in the reactor occurred during the phase of establishing and maintaining the NOB suppression (second part of period P3, time>70 days). The results are presented in FIG. 5. In the anoxic phase, a reduction is observed in the nitrites which are eliminated by the heterotrophs, in the presence of the carbon provided by the untreated water. At the end of the anoxic phase, the concentration of nitrites is low, at least two times lower than the concentration of ammonium N-NH4 (FIG. 5). As the anoxic phase is followed by an aeration phase, the concentration of nitrites at the start of the aeration phase is therefore also low, at least two times lower than the concentration of ammonium N-NH4 (FIG. 5). During the aeration phase, the ammonium is converted into nitrites; the concentration of ammonium in the reactor decreases and that of the nitrites, initially low, at least two times lower than the concentration of ammonium N-NH4, increases (FIG. 5). Conversely, the nitrate concentration does not vary during the aeration phase and remains at a low value, less than <1 mg/L (FIG. 5). The ratio of [N-NO2]/[N-NOx] at the end of the aeration step is greater than 0.8 (FIG. 5). The elimination of nitrites limits the growth of NOB since they have no available substrate when oxygen is present.

Figure 6:
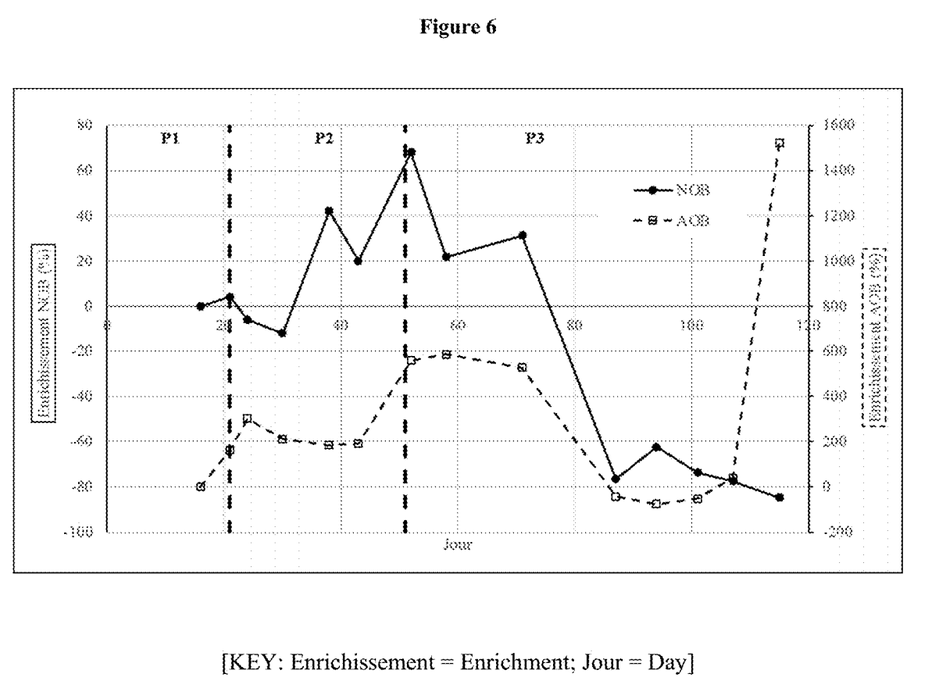
FIG. 6 shows the effect of the concentration of dissolved oxygen during the aeration phase, the effect of the elimination of nitrites, and the effect of the effective age of aerated sludge on the evolution of the nitrifying populations (AOB and NOB) of the activated sludge. The results come from molecular biology analysis using qPCR (quantitative Polymerase Chain Reaction) to quantify the DNA of each microbial population considered. The results are expressed as an enrichment percentage (or impoverishment if less than 0) of said population relative to a start date, namely day 16 (Period 1).

By coupling the elimination of nitrites with the extraction of sludge, we end up leaching the NOB from the reactor, as is evidenced in FIG. 6. It is apparent that during the first two periods, the two microbial populations AOB and NOB, although having similar upward trends, demonstrate different amplitudes of growth. Indeed, at the end of P2, the NOB population has increased by 60% compared to the start date (Day 16 (Period 1)), compared to an increase of 550% for AOB. Furthermore, during the third period, the concomitance of the three parameters (concentration of dissolved oxygen during the aeration phase, elimination of nitrites, and management of the effective age of aerated sludge) allows drastic leaching of the NOB population. On day 115, 85% of the nitrating population has thus been leached. At the same time, the amount of AOB has multiplied by 16. The operating conditions have therefore generated a change in the microbial community in favor of the AOB population, allowing the establishment of nitritation in the biological reactor.

The invention claimed is:

1. A method for the biological treatment of nitrogen in the form of ammonium in wastewater, by nitritation in a biological reactor, comprising:

at least one step a of aerating the biological reactor containing the wastewater to be treated, wherein the aeration is controlled in order to maintain a concentration of dissolved oxygen in the reactor at an average value that is greater than or equal to 1 mg/L, so as to oxidize at least part of the ammonium into nitrites by the ammonia-oxidizing bacteria present in said reactor, characterized in that the method further comprises:

at least one step b of eliminating at least part of the nitrites produced in step a by:
  a sampling b1 of water treated in step a outside the reactor, and/or by
  an anoxic biological transformation b2, steps a and b being carried out successively and cyclically so that the nitrite concentration in the reactor at the start of step a is less than 2 mg of N-NO2/L or at least two times lower than the concentration of ammonium in the reactor, and
a step c of extracting, from the reactor, a fraction of the sludge resulting from steps a and b, per unit of time, calculated so that an effective age of aerated sludge of the reactor is obtained which is less than or equal to a theoretical minimum age of aerated sludge necessary for nitrification as defined by a decreasing exponential distribution as a function of the reactor temperature,
such that the production of nitrates is minimized in comparison to the production of nitrites in the reactor by suppressing the activity of nitrite-oxidizing bacteria by means of said aeration in step a, said elimination of nitrites in step b and said effective age of aerated sludge in step c; and
the steps a, b and c are repeated until the ratio of the concentration of nitrites to the sum of the concentrations of nitrites and nitrates at the end of the aeration step a is greater than 0.8.

2. The method according to claim 1, wherein the biological reactor is an activated sludge reactor.

3. The method according to claim 1, wherein the concentration of dissolved oxygen in step a is greater than or equal to 2 mg/L.

4. The method according to claim 1, wherein the sampling b1 of water treated in step a, outside the reactor (first reactor), is carried out by draining b3 at least a fraction of the contents of the reactor resulting from step a and/or recirculating b4 at least a fraction of the contents of the reactor resulting from step a towards a second biological reactor which feeds the first reactor.

5. The method according to claim 1, wherein the anoxic biological transformation b2 is implemented by heterotrophic denitritation in the presence of carbon and/or deammonification by Anammox.

6. The method according to claim 1, wherein the elimination of at least part of the nitrites produced in step a is carried out by the anoxic biological transformation b2 and the sequence of steps a and b2 is repeated cyclically in said biological reactor.

7. The method according to claim 1, wherein the elimination of at least part of the nitrites produced in step a is carried out by a recirculation b4 of at least a fraction of the contents of the reactor (first reactor) resulting from step a towards a second biological reactor which feeds the first reactor, and by the anoxic biological transformation b2 of said fraction in said second reactor.

8. The method according to claim 1, wherein the elimination of at least part of the nitrites produced in step a is carried out by a draining b3 of at least a fraction of the contents of the reactor resulting from step a and the anoxic biological transformation b2 of the fraction eventually remaining in said biological reactor.

9. The method according to claim 1, wherein the effective age of aerated sludge of said reactor is between 50% and 90% of the theoretical minimum age of aerated sludge.

10. The method according to claim 1, wherein steps a, b and c are repeated until the ratio of the concentration of nitrites to the sum of the concentrations of nitrites and nitrates at the end of the aeration step a is greater than 0.9.

11. A method for the biological treatment of nitrogen in wastewater, by nitritation-denitritation and optionally deammonification, characterized in that the nitritation is implemented by the method according to claim 1.

12. The method according to claim 1, wherein the effective age of aerated sludge of said reactor is between 60% and 80% of the theoretical minimum age of aerated sludge.

* * * * *